United States Patent [19]

Williams

[11] Patent Number: 4,557,434

[45] Date of Patent: Dec. 10, 1985

[54] TAPE REMAINING CIRCUIT

[75] Inventor: Marshall Williams, Fremont, Calif.

[73] Assignee: Ampex Corporation, Redwood City, Calif.

[21] Appl. No.: 418,907

[22] Filed: Sep. 16, 1982

[51] Int. Cl.⁴ .......................... G01B 1/04; G11B 15/32
[52] U.S. Cl. ..................................... 242/189; 360/137
[58] Field of Search .............. 242/186, 189, 190, 67.5; 360/71, 72.3, 73, 74.1, 74.2, 137; 318/6, 7

[56] References Cited

U.S. PATENT DOCUMENTS 3,606,201  9/1971  Petusky ................................ 242/190
3,910,527  10/1975  Buhler et al. ........................ 242/186

Primary Examiner—Leonard D. Christian

Attorney, Agent, or Firm—George B. Almeida; Joel D. Talcott

[57] ABSTRACT

The tension arm position of a tape recorder is sensed and any change in position is added as a correction factor to the capstan tach or tape timer tach count generated during a reel tach period. To this end, the tension arm position signal is clamped to ground at the start of the capstan count. At the end of the capstan count, the tension arm position is sensed to provides a value that is proportional to the change in the position that has occurred during the capstan count. The value is then added to the capstan count to provide a corrected capstan count that no longer contains a tension arm error and constitutes a precise tape remaining output signal.

15 Claims, 1 Drawing Figure

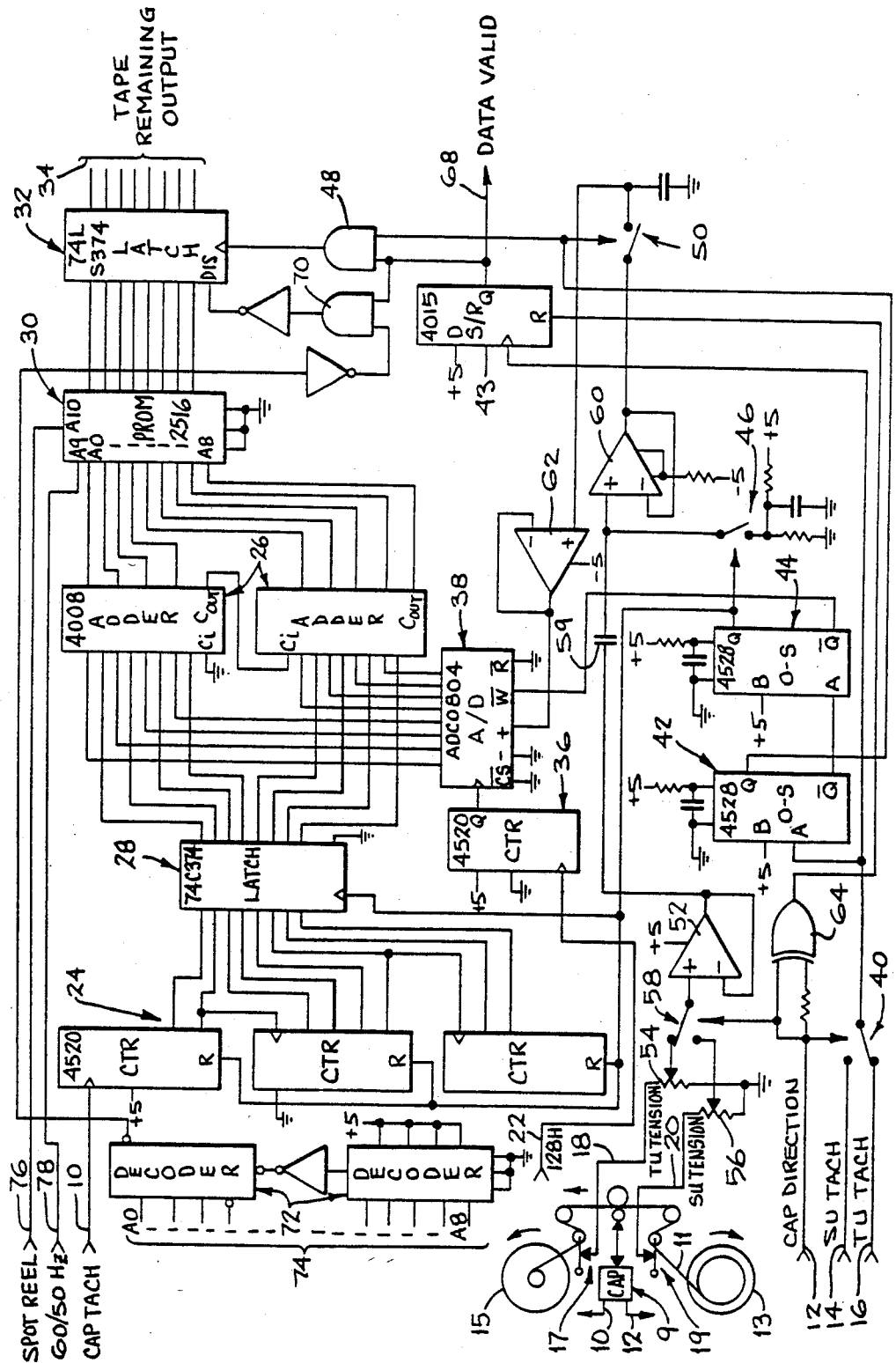

TAPE REMAINING CIRCUIT

BACKGROUND AND SUMMARY OF THE INVENTION

The present invention relates to circuits for determining the direction and position of a magnetic tape, and more particularly to a tape remaining circuit which provides a numeric value, in equal increments of the time remaining, corresponding to the amount of tape remaining on a supply reel.

Typical of end-of-tape circuits for determining the direction and amount of tape on the supply reel of, for example, a video production recorder, are those systems which determine the tape remaining by comparing the rotation rate of the reel to the rotation rate of the capstan or tape timer tachs. Typically, the number of capstan tach pulses are counted during a selected reel tach period. The value of capstan tach counts then are averaged over several reel tach periods to average out and thus minimize, errors caused, for example, by tension arm movement. The time required to perform the integration is relatively large, i.e., several seconds, and therefore present end-of-tape circuits take a like amount of time to provide a valid tape remaining value. This is particulary disadvantageous when the direction of tape is reversed, particularly towards the end of the tape. That is, the failure to provide a valid tape remaining value during a few reel rotations, can allow the tape to run off the reel.

The present invention overcomes the shortcomings of previous mention by providing a tape remaining circuit which minimizes integration time, while compensating for perturbations due to tension arm movement, thereby rapidly providing valid indication of the exact position and direction of a magnetic tape. To this end, the number of capstan tach or tape timer tach pulses are counted during a reel tach period. The tension arm position is sensed and any change of position thereof is added as a correction factor to the capstan tach or tape timer tach count. The combined count provides a corrected capstan or tape timer count which no longer contains a tension arm error. The circuit instantly minimizes errors due to tension arm position and thus reduces the time required for integration or averaging. In a modification, the output is further modified to provide a linearized signal that produces a numeric value equal to a given length of tape remaining, i.e., which compensates for the squaring effects of the radius of the reel.

Accordingly, it is an object of the invention to determine rapidly the tape remaining on a supply reel.

It is another object to provide a circuit for sensing the direction and position of a tape with a minimum of integration time.

It is a further object to sense a change in the position of a tension arm and instantly provide a tape remaining value which compensates for variation in the tension arm position.

Another object is to provide a linearized signal as a numeric value equal to a given length of tape remaining on a reel.

BRIEF DESCRIPTION OF THE DRAWINGS

The sole FIGURE is a schematic diagram of an implementation of the invention combination.

DESCRIPTION OF THE PREFERRED EMBODIMENTS

Referring to the FIGURE a capstan tach input signal corresponding to a train of pulses generated via a conventional capstan tachometer device 9, is provided at input 10. A capstan (or tape) direction input signal also is provided via the device 9 on input 12 as a logic state indicating whether a tape 11 is being pulled in a forward or reverse direction. Supply and takeup reel tach signals are provided on inputs 14, 16 respectively, and are indicative of the rate of rotation of supply and takeup reels 13, 15 respectively, as generated via conventional reel tachometer devices (not shown).

Takeup and supply tension arm error signals are supplied to inputs 18, 20 respectively, and comprise analog voltages indicative of the position of takeup and supply tension arms 17, 19 respectively, over a preselected range of position change. A 128 H signal is provided on input 22 and comprises the system master clock, i.e., a clock of the order of 2 MHz.

The capstan tach signal on input 10 provides a clock to a capstan counter 24, which thence is coupled to a binary adder 26 via a capstan tach count latch 28. Adder 26 is coupled to a programmable read only memory (PROM) 30 and thence to an output latch 32. Latch 32 supplies a numerical value on an output bus 34 which corresponds to the tape remaining.

The 128 H signal on input 22 clocks a counter 36 which, in turn, clocks an A/D converter 38. The output of the converter 38 is supplied to the binary adder 26, along with the capstan tach count from the latch 28.

The supply and takeup tach signals on inputs 14, 16 are supplied to respective inputs of switch means 40, and thence to the input of a one-shot multivibrator 42 as well as to the clock input of a validity shift register 43. One-shot 42 is coupled in turn at a not-true output to a one-shot 44. The latter one-shot supplies a true output to reset the capstan counter 24, to clock the capstan tach count latch 28, and to control the status of a clamping circuit 46. The not-true output of one-shot 44 is coupled to the write input of the A/D converter 38. The true output of one-shot 42 is coupled to an AND gate 48 and also controls the switching of a sample/hold (S/H) circuit 50.

Thus, one-shot 42 is used to sample and hold the output latch 32 via the AND gate 48, and provide the trigger to the succeeding one-shot 44. One-shot 44 clamps the tension error to a pre-selected zero level via the clamping circuit 46, resets the capstan tach counter 24, latches the capstan tach count in the latch 28 and initiates the A/D converter 38 conversion process.

The takeup and supply tension error signals on inputs 18, 20 are supplied via the tension arms 17, 19 to the positive input of an operational amplifier 52 via respective potentiometers 54, 56 and switch means 58. The operational amplifier 52 is coupled, via AC coupling capacitor 59, to the positive input of a second operational amplifier 60 which, in turn, is coupled to the S/H circuit 50. The latter circuit's output is coupled to the positive input of a further operational amplifier 62 which supplies the sampled and held tension error signal to the A/D converter 38.

The capstan direction signal on input 12 controls the status of the switches 40, 58 and is also supplied to an exclusive OR gate 64. The latter is coupled to the reset input of the validity shift register 43. The shift register 43 supplies a data valid output signal on an output line 68, and also is coupled to the second input of the AND gate 48 as well as to a first input of an AND gate 70. AND gate 48 clocks the output latch 32, while AND gate 70 is coupled via an inverter to the disable input of the latch 32. The second input to AND gate 70 is provided by decoder means 72, which decodes a command on a bus 74 from a system microprocessor (not shown) which directs when data is enabled to the output bus 34 via the output latch 32.

In operation, a supply reel tach pulse is supplied on either input 14 or 16, as determined by the capstan direction signal on input 12 and switch means 40. The reel tach pulse triggers the one-shot 42. This in turn triggers one-shot 44, which resets the capstan tach counter 24, and also clamps the tape tension arm signal supplied on the corresponding input 18 or 20, to the center of a preselected range via the clamping circuit 46. After the one-shot 42 changes state, the clamp is removed and the capstan tach counter 24 begins counting incoming capstan tach pulses. When the next reel tach pulse occurs, one-shot 42 fires again causing the tension arm error signal that has occurred since it was clamped, to be sampled and held by the S/H circuit 50. One-shot 42 also triggers one-shot 44 again. One-shot 44 then causes the A/D converter 38 to digitize the sampled and held tension value from circuit 50, and further causes the capstan tach count latch 28 to latch the capstan tach count accumulated between reel tach pulses. The capstan tach count and the tension arm error data are then summed in the binary adder 26 and the resulting summation is a corrected capstan or tape timer count that no longer contains a tension arm error.

In a further modification, the corrected signal from adder 26 is supplied to the PROM 30. The latter changes the number acquired to linearize the output supplied to the output latch 32, whereby the resulting binary number represents a given amount of tape remaining on the supply reel in equal increments of time remaining. That is, the squaring effect due to the radius of the reel is removed.

When the next reel tach pulse is supplied to the one-shot 42 via inputs 14 or 16, the one-shot is again triggered and produces a clock for the output latch 32 which allows the data to be placed on the output bus 34, but only if the output latch 32 is enabled by the decoder means 72.

If a direction change occurs, the capstan direction signal on input 12 changes state, and supplies a reset pulse to the validity shift register 43 via the exclusive OR gate 64. This inhibits the output latch 32. The output 68 provides an indication of invalid data, and the validity shift register 43 does not generate a data valid flag until the data at output latch 32 is valid again. In general, the occurrence of two reel tach pulses is required after a direction change to provide a valid data flag.

The PROM 30 contains a linearizing map as mentioned previously, for both a 50 Hz PAL/SECAM and a 60 Hz NTSC/PAL-M color television standard, for reels having standard hubs. In addition, the PROM 30 allows for smaller hub diameters, such as those found in spot reels. Thus input signals corresponding to use of a spot reel, and to the 50/60 Hz standard, are supplied to the PROM 30 by inputs 76, 78 respectively. Thus several options are programmed into the PROM 30 to compensate for the variations in color standards and reel sizes.

It may be seen that any change of position of the tension arm is added as a correction factor to the capstan tach (or a tape timer tach) count, thereby instantly minimizing the error due to the arm changes and reducing the need for integration or averaging. This, in turn, allows the rapid generation of the tape remaining output signal.

The tension arm sensitivity as seen at the output of the A/D converter 38 is preferably the same as the capstan sensitivity. Further, depending upon the tape standard use, the output of the operational amplifier 52 is adjusted for a selected voltage level when the tape is moved, for example, one inch through the capstan, i.e., when the tension arm has changed the tape path length by the selected distance of one inch.

What is claimed is:

1. A circuit for determing the tape remaining of a reel wherein reel rotation is indicated by reel tach pulses and the tape movement is responsive to changes in position of a tension arm, comprising:
    means including counter means for generating capstan tach pulses indicative of the extent of tape movement between successive reel tach pulses;
    means for producing a tension arm position signal indicative of an instantaneous change in the position of the tension arm corresponding to a change in the extent of tape movement; and
    means for combining the capstan tach pulses and the tension arm position signal to provide a corrected tape remaining output signal.

2. The circuit of claim 1 wherein the means for producing include:
    sample/hold means coupled to sense the instantaneous change of tension arm position; and
    A/D converter means coupled from the sample/hold means to the means for combining.

3. The circuit of claim 2 including:
    first multivibrator means for changing state in response to the selected reel rotation; and
    second multivibrator means responsive to the first multivibrator means for controlling the A/D converter means and resetting the counter means.

4. The circuit of claim 2 wherein the means for combining include:
    binary adder means coupled to the A/D converter means and to the counter means.

5. The circuit of claim 4 further including
    programmable read only memory means coupled to the binary adder means; and
    output latch means coupled to the programmable read only memory means.

6. The circuit of claim 2 wherein the means for producing further include:
    switch means responsive to the tape direction for switching to the reel which supplies the tape; and
    amplifier means coupled to the switch means for supplying a tension arm position signal to the sample/hold means.

7. The circuit of claim 6 further including:
    clamping means for clamping the amplifier means to a selected clamp level prior to producing the tension arm position signal.

8. The circuit of claim 6 wherein the amplifier means include:
    a first operational amplifier coupled to the switch means; and a second operational amplifier coupled to the first operational amplifier and thence to the sample/hold circuit means.

9. The circuit of claim 2 further including:
gate means for supplying a reset pulse indicative of a change in tape direction; and
validity indicator means responsive to the gate means to inhibit the corrected tape remaining output signal.

10. A circuit for determining the tape remaining on a reel wherein the tape movement is responsive to a tension arm, comprising:
means for supplying a first count value indicative of the extent of tape movement relative to a selected reel rotation;
means for generating a second count value indicative of a change in the tension arm position;
means for clamping said means for generating the second count value, prior to initiating the first count value;
wherein the second count value is generated at the end of the first count value; and
means for adding the second count value to the first count value to provide a corrected tape remaining output signal.

11. The circuit of claim 10 wherein the means for generating include:
means responsive to a change in tension arm position for generating an analog voltage indicative of the change;
converter means for supplying a digital count of the analog voltage to the means for adding.

12. The circuit of claim 11 wherein the means for generating an analog voltage include:
amplifier means for providing a signal indicative of tension arm position change; and
sample/hold means coupled to the amplifier means for generating the corresponding analog voltage at the end of taking the first count value.

13. The circuit of claim 10 further including: data valid means for inhibiting output of the tape remaining output signal in response to a change in tape direction.

14. A circuit for determining the tape remaining on a reel comprising:
means for supplying reel tach pulses indicative of reel rotation rate;
means for generating a digital value indicative of tape movement which occurs between reel tach pulses;
means for generating a second digital value indicative of additional instantaneous tape movement; and
means for combining the first and second digital values to provide a corrected determination of tape remaining.

15. A circuit for determining the tape remaining on a reel, wherein tape movement is monitored by a capstan tach and is affected by a tension arm, and the reel rotation is monitored by reel tach pulses, comprising:
means for detecting successive reel tach pulses from the reel tach;
counter means for counting the number of capstan pulses from the capstan tach between successive reel tach pulses;
means for providing an analog voltage signal indicative of a change in the tension arm position;
means for generating a tension arm digital count of the analog voltage signal;
means for combining the tension arm digital count with the counter means count, to produce a corrected tape remaining output signal.

* * * * *

UNITED STATES PATENT AND TRADEMARK OFFICE
CERTIFICATE OF CORRECTION

PATENT NO.  : 4,557,434
DATED       : December 10, 1985
INVENTOR(S) : Marshall Williams It is certified that error appears in the above-identified patent and that said Letters Patent is hereby corrected as shown below:

Column 4, line 17, "of a reel" should read --on a reel--.

Column 5, line 2, "sample/-" should read --sample/--.

Column 6, line 6, no paragraph after the : (colon).

Signed and Sealed this

First Day of July 1986

[SEAL]

Attest:

DONALD J. QUIGG

Attesting Officer

Commissioner of Patents and Trademarks